United States Patent
Wolf et al.

(10) Patent No.: US 11,525,223 B2
(45) Date of Patent: Dec. 13, 2022

(54) AGGREGATE SPREADING DEVICE WITH SPREADER SYSTEM

(71) Applicant: Road Widener LLC, Delafield, WI (US)

(72) Inventors: Devin Wolf, Oconomowoc, WI (US); Devery G. Beal, Mayville, WI (US); Michael Schutte, Ixonia, WI (US)

(73) Assignee: Road Widener LLC, Delafield, WI (US)

( * ) Notice: Subject to any disclaimer, the term of this patent is extended or adjusted under 35 U.S.C. 154(b) by 68 days.

(21) Appl. No.: 16/265,530

(22) Filed: Feb. 1, 2019

(65) Prior Publication Data

US 2020/0248413 A1 Aug. 6, 2020

(51) Int. Cl.
*E01C 19/20* (2006.01)
*B60P 1/38* (2006.01)

(52) U.S. Cl.
CPC ............ *E01C 19/2045* (2013.01); *B60P 1/38* (2013.01); *E01C 19/20* (2013.01); *E01C 2019/2075* (2013.01); *E01C 2301/02* (2013.01)

(58) Field of Classification Search
CPC ........ E01C 19/15; E01C 19/182; E01C 19/20; E01C 19/201; E01C 19/2045; E01C 19/4866
USPC ........................... 37/105, 274, 411, 431, 435
See application file for complete search history.

(56) References Cited

U.S. PATENT DOCUMENTS

| | | | |
|---|---|---|---|
| 1,370,815 A | 3/1921 | Henderson | |
| 1,510,051 A | 9/1924 | Forbes | |
| 1,879,232 A | 9/1932 | Henry | |
| 2,342,863 A | 2/1944 | Hlavaty | |
| 2,588,725 A | 3/1952 | Hogan | |
| 2,653,700 A | 9/1953 | Sloane | |
| 2,727,400 A | 12/1955 | Lorig | |
| 2,728,445 A | 12/1955 | Erickson | |
| 2,786,635 A | 3/1957 | Oishi | |
| 2,793,875 A | 5/1957 | Quayle | |
| 2,797,794 A | 7/1957 | Bradley | |
| 2,878,926 A | 3/1959 | Harty | |
| 2,966,065 A | 12/1960 | Renner | |
| 2,971,631 A | 2/1961 | Gray | |
| 3,012,992 A | 12/1961 | Pigott | |
| 3,109,351 A * | 11/1963 | Dunn | E01C 19/15 404/104 |

(Continued)

FOREIGN PATENT DOCUMENTS

| | | |
|---|---|---|
| CA | 2733030 | 1/2013 |
| CA | 2824966 | 2/2018 |

*Primary Examiner* — Gary S Hartmann
(74) *Attorney, Agent, or Firm* — Reinhart Boerner Van Deuren P.C.

(57) ABSTRACT

An aggregate spreading device includes a hopper, a conveyor system disposed below the hopper, and a spreader system extending from at least one side of the aggregate spreading device and configured to receive aggregate from the conveyor system. The spreader system includes a vertical support coupled to a frame of the aggregate spreading device, a first wall extending from a first end attached to the vertical support, and a second wall extending from a second end of the first wall. A lift actuator is configured to adjust the vertical placement of the spreader system and causing the first and second walls to move vertically.

16 Claims, 18 Drawing Sheets

(56) References Cited

U.S. PATENT DOCUMENTS

| | | | | |
|---|---|---|---|---|
| 3,216,337 | A * | 11/1965 | MacDonald | E01C 19/15 404/104 |
| 3,512,461 | A * | 5/1970 | Green | E01C 19/15 404/120 |
| 3,664,137 | A * | 5/1972 | Lett | E02F 5/10 405/50 |
| 3,680,451 | A * | 8/1972 | Birtchet | E01C 19/187 404/104 |
| 3,997,277 | A * | 12/1976 | Swisher, Jr. | E01C 19/4873 404/84.05 |
| 4,579,178 | A * | 4/1986 | Dover | E02F 3/7659 172/297 |
| 4,678,365 | A * | 7/1987 | Ban | E01C 19/187 404/118 |
| 4,842,441 | A * | 6/1989 | Watkins | E01C 19/15 404/107 |
| 4,871,025 | A | 10/1989 | Mayfield et al. | |
| 4,892,155 | A | 1/1990 | Wanamaker | |
| 4,900,185 | A * | 2/1990 | Foertsch | E01C 19/185 404/104 |
| 4,936,392 | A | 6/1990 | Kitchin | |
| 4,953,625 | A * | 9/1990 | Hurworth | E02F 3/7609 172/305 |
| 5,098,252 | A | 3/1992 | Sheesley et al. | |
| 5,330,287 | A * | 7/1994 | Constantin | E01C 23/082 404/90 |
| 5,470,175 | A * | 11/1995 | Jensen | E01C 19/15 404/108 |
| 5,599,135 | A * | 2/1997 | Delaurenti | E01C 19/187 172/815 |
| 5,701,693 | A | 12/1997 | Brocious et al. | |
| 5,895,173 | A | 4/1999 | O'Brien et al. | |
| 5,927,617 | A * | 7/1999 | Musso, Jr. | B60P 1/36 239/657 |
| 6,086,287 | A * | 7/2000 | Sharpe | E01C 23/06 404/75 |
| 6,089,785 | A * | 7/2000 | Bergman | E01C 23/06 404/101 |
| 6,203,244 | B1 | 3/2001 | Van Ornum | |
| 6,238,136 | B1 * | 5/2001 | Sovik | E01C 19/48 404/118 |
| 6,283,672 | B1 * | 9/2001 | Sovik | E01C 19/48 404/118 |
| 6,322,287 | B1 * | 11/2001 | Yelton | E01C 19/15 404/102 |
| 6,386,822 | B1 | 5/2002 | Burr | |
| 6,435,766 | B1 * | 8/2002 | Titford | B62D 49/0678 172/554 |
| 6,560,904 | B2 | 5/2003 | Guggino | |
| 6,619,881 | B1 | 9/2003 | Harvey | |
| 6,619,882 | B2 | 9/2003 | Harvey | |
| 6,702,208 | B1 | 3/2004 | Hadler et al. | |
| 7,033,106 | B2 | 4/2006 | Harvey | |
| 7,273,111 | B2 | 9/2007 | Johnson | |
| 7,311,465 | B2 * | 12/2007 | Guntert, Jr. | E01C 19/185 404/101 |
| 7,540,687 | B2 | 6/2009 | Neumann | |
| 7,824,127 | B1 * | 11/2010 | Shunn | E01C 19/187 404/75 |
| 8,221,026 | B2 | 7/2012 | Munz et al. | |
| 8,297,879 | B1 * | 10/2012 | Schmidt | E01H 1/003 404/98 |
| 8,322,947 | B2 | 12/2012 | Neumann | |
| 8,403,594 | B2 * | 3/2013 | Neumann | E01C 19/2045 404/110 |
| 8,449,217 | B2 * | 5/2013 | DiPizio | E02F 5/12 404/83 |
| 8,506,204 | B1 * | 8/2013 | Reames | E01C 19/266 404/86 |
| 8,888,403 | B2 * | 11/2014 | Atherton | E01C 23/03 404/108 |
| 9,797,098 | B2 * | 10/2017 | Guilmette | E01C 19/4886 |
| RE46,971 | E * | 7/2018 | Neumann | E01C 19/15 |
| D823,903 | S * | 7/2018 | Guilmette | D15/28 |
| 2003/0143024 | A1 * | 7/2003 | Sharpe | E01C 19/4853 404/75 |
| 2003/0215288 | A1 | 11/2003 | Causie et al. | |
| 2009/0194959 | A1 | 8/2009 | Mintie et al. | |
| 2013/0017017 | A1 | 1/2013 | Neumann | |
| 2013/0108365 | A1 * | 5/2013 | DiPizio | E02F 5/12 404/83 |
| 2020/0123735 | A1 * | 4/2020 | Stotlar | E02F 3/7654 |

* cited by examiner

AGGREGATE SPREADING DEVICE WITH SPREADER SYSTEM

BACKGROUND OF THE INVENTION

1. Field of the Invention

The present invention relates to the field of road paving apparatuses. More particularly, the present invention relates to an aggregate spreading device for paving shoulders and widening roads.

2. Discussion of the Related Art

Devices for road widening and creating shoulders are known in the road construction industry. Many of the devices are design for use only in laying a certain type of aggregate material, for example, dirt, gravel, asphalt, etc. In other cases, the devices need to have tooling and grade boxes replaced when a different aggregate is used. For instance, when a road widening device is laying a dirt layer, the grade box needs to be set at a certain below grade position in order to allow room for the gravel and asphalt layers that will be placed above. Similarly, when the gravel layer is being laid, the grade box needs to be set at a certain below grade position allows the gravel layer to be laid without interfering with the dirt layer but also leaving room for the asphalt layer. In turn, the grade box would then need to be raised to a position for laying the asphalt layer. As a result, a user would need to manually adjust the grade level of the grade boxes or use a different machine entirely for each aggregate level.

What is therefore needed, is a single aggregate spreading device that is able to adjust the grade level positioning and orientation of the grade boxes of its spreader system, so that a single aggregate spreading device may be used to lay any and all aggregate layers of a road widening project without retooling or replacement of parts.

SUMMARY OF THE INVENTION

In accordance with an aspect of the invention, an aggregate spreading device includes a hopper, a conveyor system disposed below the hopper, and a spreader system extending from at least one side of the aggregate spreading device and configured to receive aggregate from the conveyor system. The spreader system includes a vertical support coupled to a frame of the aggregate spreading device, a first wall extending from a first end attached to the vertical support, and a second wall extending from a second end of the first wall. A lift actuator is configured to adjust the vertical placement of the spreader system and causing the first and second walls to move vertically.

According to another aspect of the invention, the aggregate spreading device may include a position actuator for transitioning the spreader system between a storage position and an deployed position. The aggregate spreading device may also include a slope actuator configured to adjust the slop angle of the spreader system.

According to yet another aspect of the invention, the vertical support may include an inner portion slidable engaged within an outer portion. As the lift actuator adjusts the vertical placement of the spreader system, the inner portion moves within the outer portion.

According to another aspect of the invention, the first wall may include one or more segments coupled together to form a width of the first wall. Additionally, the first wall may have a concave surface.

In accordance with another aspect of the invention, an aggregate spreading device includes a hopper supported by a support frame, a conveyor system disposed below an exit opening of the hopper, a first spreader system disposed at a first end of the conveyor system, and a second spreader system disposed at a second end of the conveyor system. The aggregate spreading device may also include at least one lift actuator configured to independently adjust the vertical placement of each spreader system. Further, the aggregate spreading device may include at least one position actuator configured to transition each spreader system between a storage position and an deployed position.

According to another aspect of the invention, each spreader system may include a vertical support configured as a slide tower including a first portion slidably engaged with a second portion, a first wall having a first end attached to the vertical support, and a second wall extending from a second end of the first wall. In turn, the lift actuator may cause the first portion of the vertical support to move with respect to the second portion of the vertical support. Further, the first portion of the vertical support may be at least partially surrounded by the second portion of the vertical support. It is also contemplated that the first wall may have a concave surface.

According to yet another aspect of the invention, the vertical support may include an alignment element to guide movement of the first portion support with respect to the second portion of the vertical support. The alignment element may include a slot formed in the second portion of the vertical support and an extension extending outward from the first portion of the vertical support and into the slot.

In accordance with yet another aspect of the invention, a spreader system for an aggregate spreading device includes a vertical support coupled to the aggregate spreading device, a first wall extending from a first end coupled to the vertical support to a second end, and a second wall extending from the second end of the first wall. The vertical support may be configured as a slide tower including a first portion slidably engaged with the second portion. Further, a lift actuator is configured to cause the first portion of the vertical support to move with the respect to the second portion of the vertical support to adjust the vertical position of the first and second walls.

According to another aspect of the invention, the vertical support includes an alignment element to guide movement of the first portion of the vertical support. The alignment element may include a slot formed in the second portion of the vertical support and an extension extending outward from the first portion and into the slot.

According to another aspect of the invention, a position actuator may extend from the first wall to the aggregate spreading device. The position actuator is configured to move the spreader system between a deployed position and a storage position. Additionally, the first wall may include a first segment and one or more removable extension segments.

BRIEF DESCRIPTION OF THE DRAWINGS

A clear conception of the advantages and features constituting the present invention and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
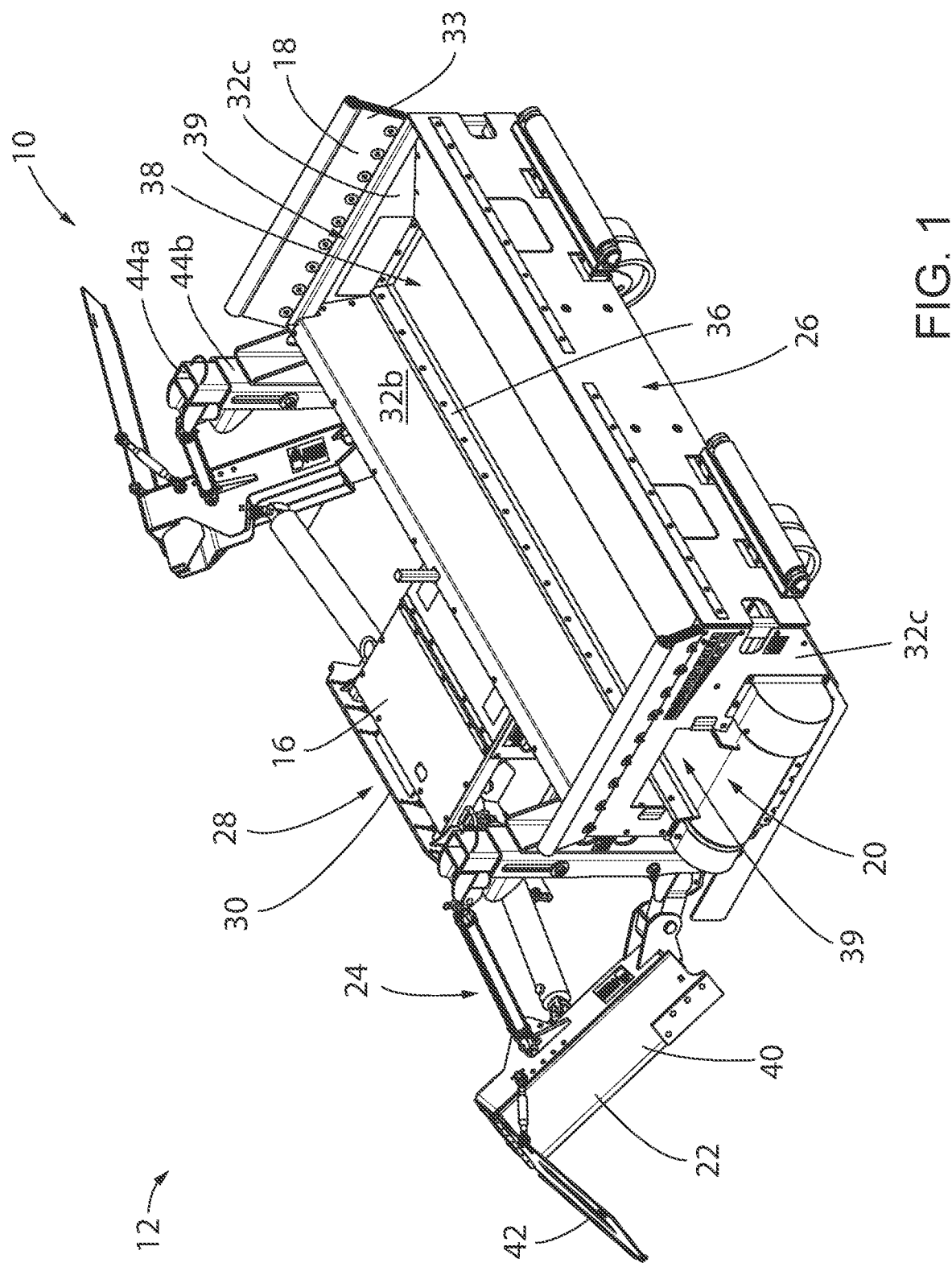
FIG. 1 is a perspective view of an aggregate spreading device, according to an embodiment of the invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected", "attached", or terms similar thereto are often used. They are not limited to direct connection but include connection through other elements where such connection is recognized as being equivalent by those skilled in the art.

DETAILED DESCRIPTION OF EMBODIMENTS

The present invention and the various features and advantageous details thereof are explained more fully with reference to the non-limiting embodiments described in detail in the following description.

Throughout this description, various terms denoting direction, such as left and right, front and rear, up and down, top and bottom, and the like may be used. The directions are not intended to be limiting but are used to describe relationships of elements with respect to each other in the accompanying drawings. Unless mutually exclusive, it is contemplated that the elements may be reversed, for example, by turning a component around or upside down without deviating from the scope of the present invention.

Figure 2:
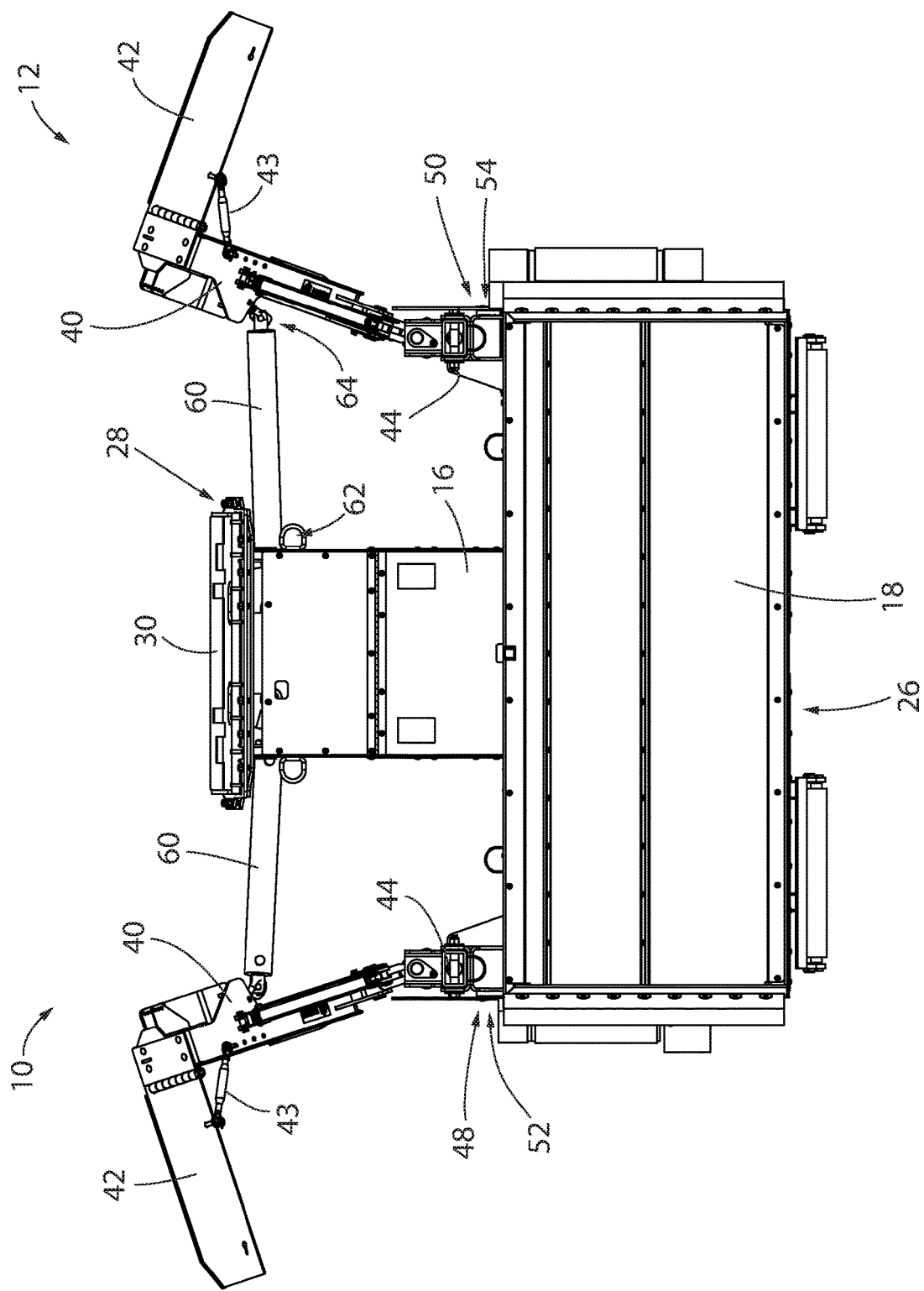
FIG. 2 is a top view of the aggregate spreading device of FIG. 1 with spreader system in a storage position.
Figure 3:
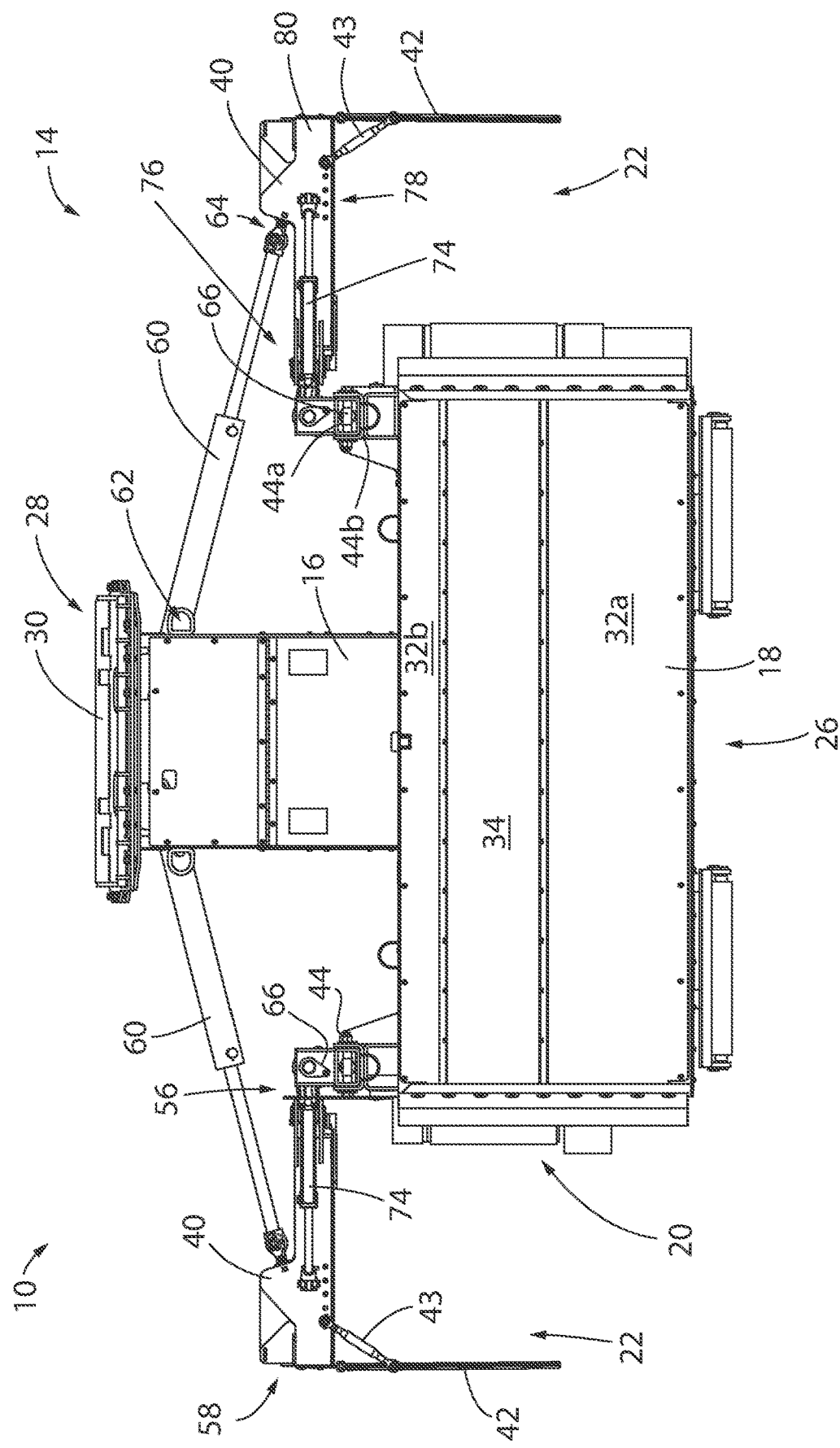
FIG. 3 is a top view of the aggregate spreading device of FIG. 1 with spreader system in a deployed position.
Figure 4:
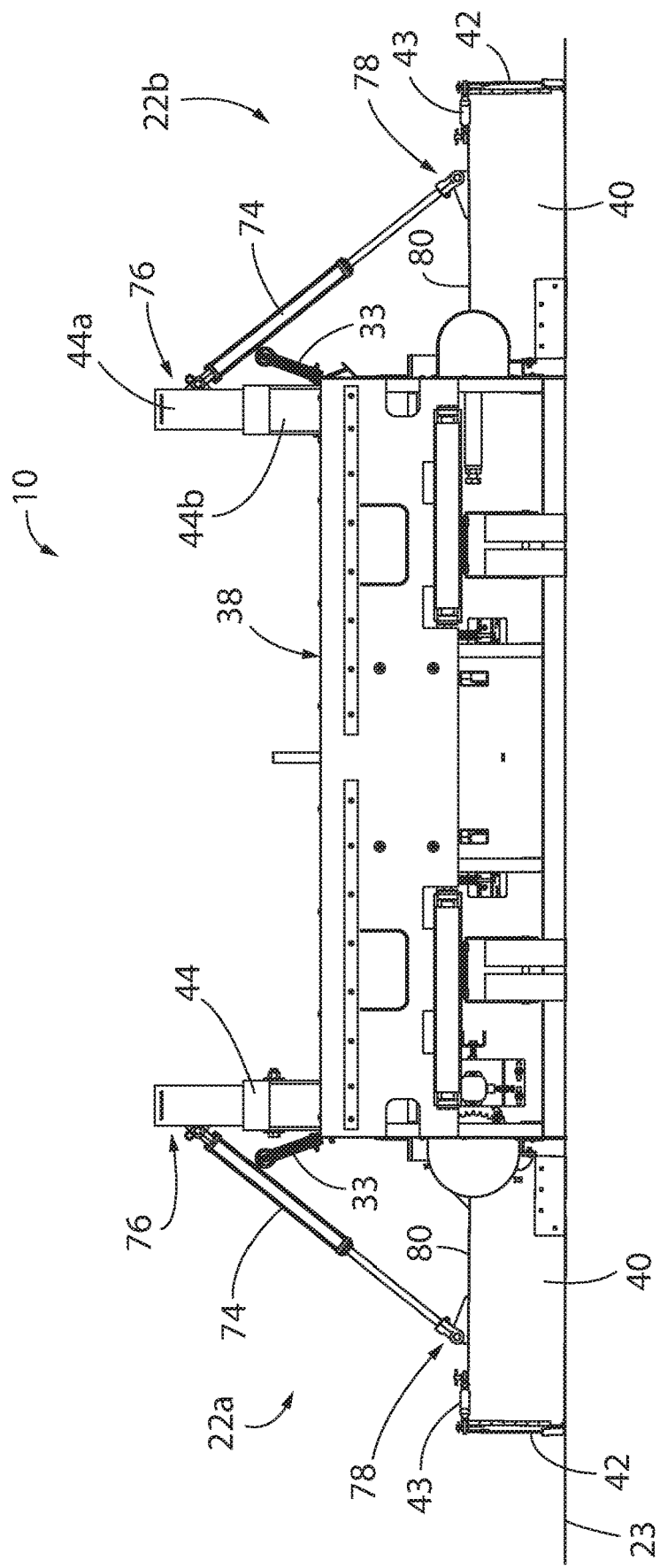
FIG. 4 is a front view of the aggregate spreading device of FIG. 1 with each spreader system in the deployed position and disposed at grade level.
Figure 5:
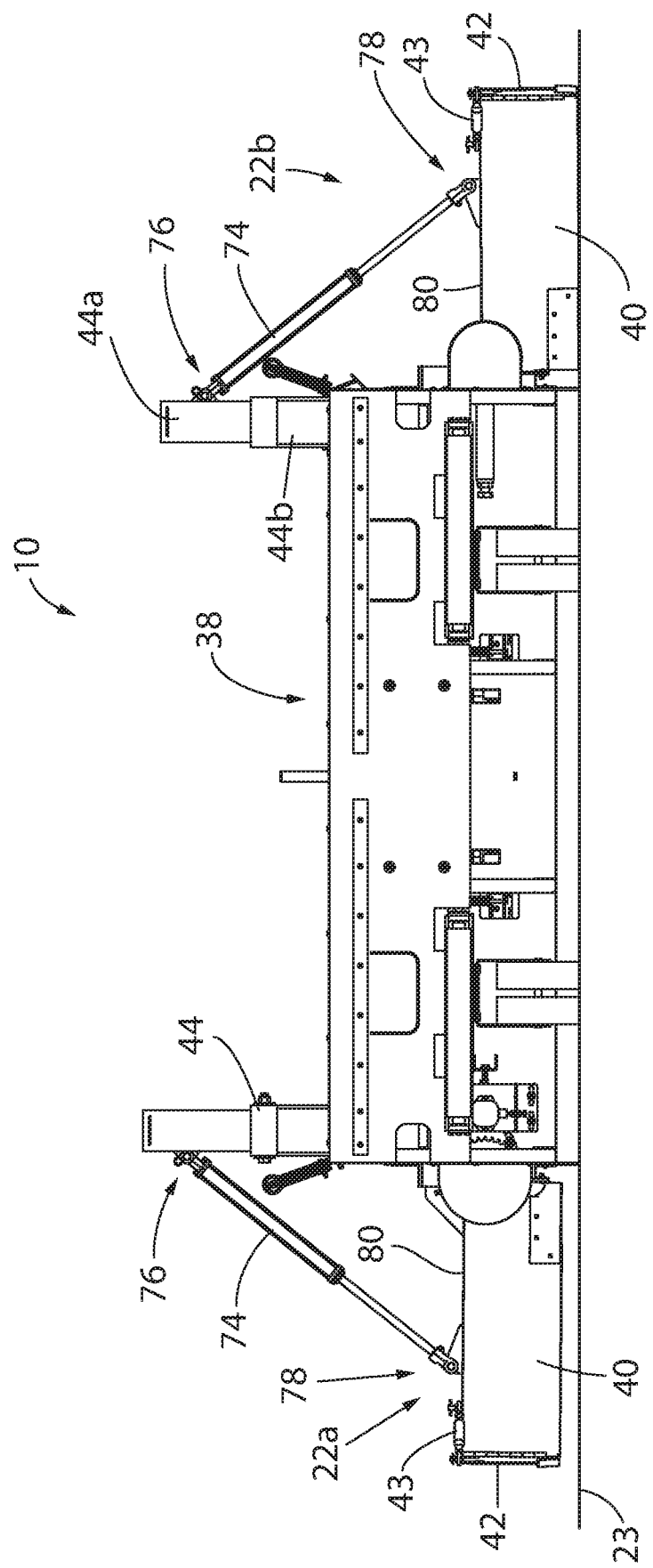
FIG. 5 is a front view of the aggregate spreading device of FIG. 1 with a left spreader system in the deployed position and disposed above-grade and a right spreader system in the deployed position and disposed at-grade.
Figure 6:
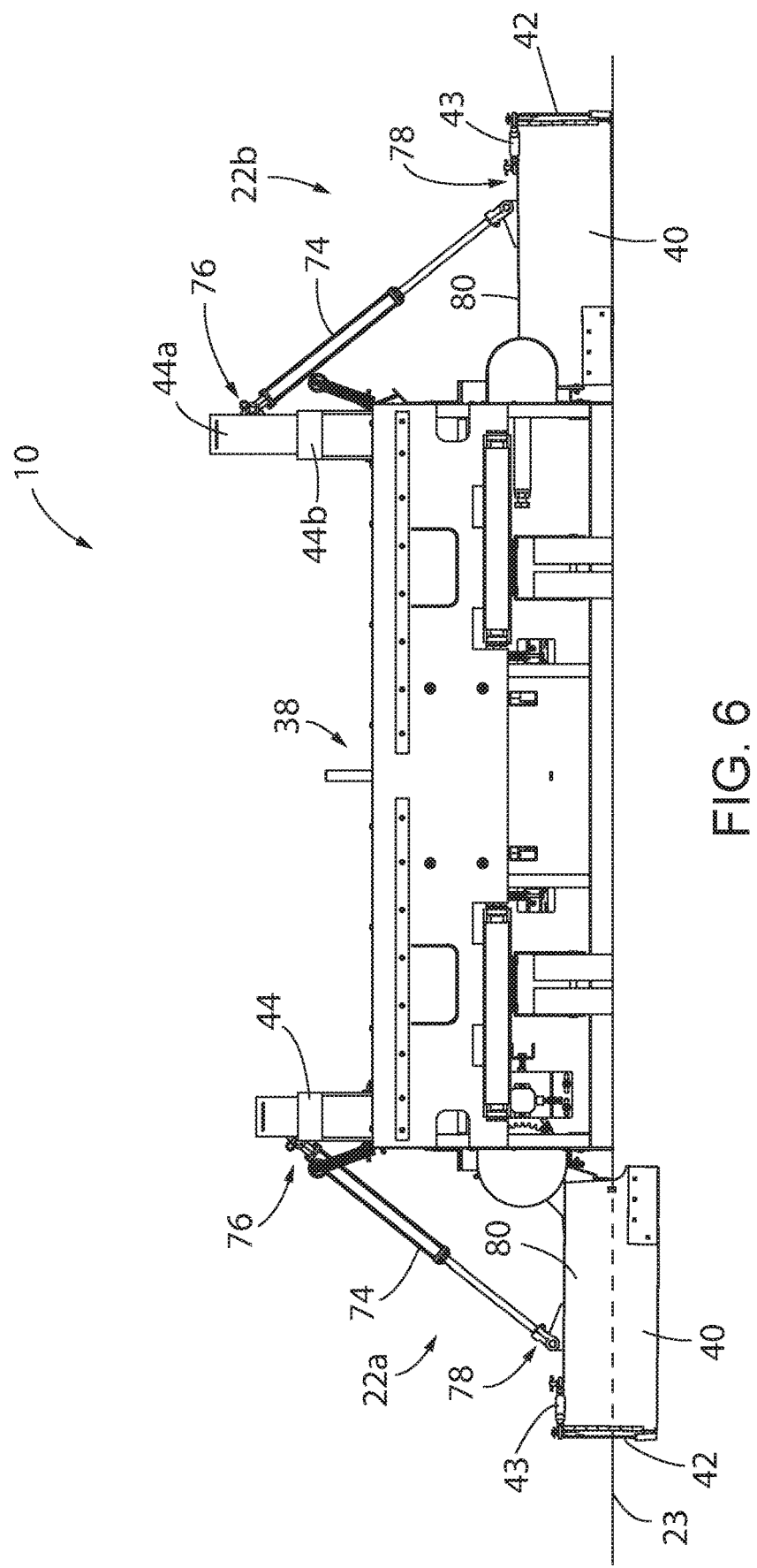
FIG. 6 is a front view of the aggregate spreading device of FIG. 1 with the left spreader system in the deployed position and disposed below-grade and the right spreader system in the deployed position and disposed at-grade.

Referring first to FIGS. 1-3, an aggregate spreading device 10 is shown. While FIG. 1 depicts a perspective view of the aggregate spreading device 10, FIGS. 2-3 further depict top views of the aggregate spreading device 10 in a storage position 12 and a deployed position 14, respectively. The aggregate spreading device 10 includes a support frame 16, a hopper 18, a conveyor system 20, one or more spreader systems 22, and an actuator system 24.

The support frame 16 extends from a front surface 26 of the spreading device 10 to a rear surface 28 of the spreading device 10, with the hopper 18 and conveyor system 20 being disposed toward the front surface 26 of the spreading device 10. At the rear surface 28, the support frame 16 is attached to a mounting plate 30. The mounting plate 30 allows for a vehicle (not shown), such as a host machine (for example, but not limited to a wheel loader or skid steer), to be attached to the spreading device 10. As shown, the mounting plate 30 may be oriented at an angle 10° C. forward of vertical in order to optimize a range of tilting motion for the host machine. In other embodiments of the invention, the mounting plate 30 may be oriented vertically or at any other angle.

As previously stated, the hopper 18 may be disposed toward the front surface 26 of the spreading device 10 and is supported by the support frame 16. The hopper 18 includes a number of walls 32 and is configured to receive aggregate from another vehicle, such as a dump truck. The walls 32 may be further described as a front wall 32a, a rear wall 32b, and sidewalls 32c. In the representative embodiment of the invention, the front wall 32a is oriented at an angle, the rear wall 32b is oriented at another angle, and the sidewalls 32c are oriented vertically and assist in securing the hopper 18 to the support frame 16. In other embodiment of the invention, any combination of the walls may be oriented vertically or at varying angles. Further yet, other embodiment of the invention may include more or less than the four (4) walls 32 shown in FIGS. 1-3.

The walls 32 of the hopper 18 are configured to direct the aggregate to the conveyor system 20, which is disposed below the hopper 18. By orienting a number of the walls 32 at an angle toward the conveyor system 20, the speed and force at which the aggregate is moved toward the conveyor system 20 is reduced. In addition, FIG. 1 further illustrates a vertical deflection component 36 disposed along a bottom surface of at least the front and rear walls 32a, 32b. The vertical deflection component 36 directs aggregate to fall vertically from the hopper 18 and onto the conveyor system 20 to deter misalignment of the elements of the conveyor system 20, which will be described below. In turn, the conveyor system 20 is configured to move the aggregate from the hopper 18 and to the spreader system 22.

In addition, some of the walls 32 may include shield walls 33 attached at the top thereof. As shown in the representative embodiment of the invention, shield walls 33 are coupled to the top of the walls 32 of the hopper 18 adjacent the spreader systems 22. In turn, the shield walls 33 prevent excess aggregate from building in the spreader system 22 and ensures that the aggregate provided to the spreader system 22 is from the conveyor system 20. In varying embodiments of the invention, shield walls 33 may be coupled to the top of any walls 32 of the hopper 18, not just sidewalls 32c, as shown in the representative embodiment of the invention. The shield walls 33 assist in minimizing unintended spills of the aggregate as the aggregate is deposited in the hopper 18.

The conveyor system 20 includes a conveyor belt 34 and a number of rollers horizontally aligned beneath an opening 38 of the hopper 18. In the representative embodiment of the invention, the conveyor belt 34 is able to move in either direction horizontal to move the aggregate toward either sidewall 32c. In other embodiments of the invention, the conveyor belt 34 may be configured to move only in one horizontal direction to move the aggregate toward a single sidewall 32c. In addition, at least one of the sidewalls 32c includes an exit opening 39 formed therein to allow the conveyor system 20 to move debris to the spreader system 22. For instance, in embodiments of the invention having the conveyor system 20 configured to move in both horizontal directions, each sidewall 32c includes an exit opening 39.

Conversely, in embodiments of the invention having the conveyor system 20 configured to move in one horizontal direction, an exit opening may be formed in the sidewall 32c that the aggregate is moved toward.

In other embodiments of the invention, the conveyor system 20 may be replaced with another means moving aggregate from the hopper 18 and to the spreader system 22. For example, chains may be used to displace aggregate from the hopper 18. In addition, the conveyor belt 34 may be any functionally equivalent apparatus known in the art including, but not limited to, a chain conveyor, a screw conveyor, auger, and any pneumatic, flexible, and vibrating system.

In varying embodiments of the invention, the spreader system 22 may be a single spreader system disposed on a single side of the spreading device 10 or a dual spreader system disposed on both sides of the spreading device 10 (as shown in FIGS. 1-16). In FIGS. 1 and 2, the spreading device 10 is shown in the storage position 12, in which the spreader system 22 is contracted to minimize the width of the spreader device 10 for storage and transportation of the device. In FIG. 3, the spreading device 10 is shown in the deployed position 14, in which the spreader system 22 is extended and aligned with the conveyor system 20. In the representative embodiment of the invention, the spreader system 22 is a strike off blade or grader box having a first wall 40 oriented perpendicular to a second wall 42. In other embodiments of the invention, the second wall 42 may be oriented at any angle. As shown in FIG. 2, a brace 43 may extend from the first wall 40 to the second wall 42 to provide additional reinforcement for the second wall 42. It is also contemplated that the brace 43 may be adjustable to adjust the angle of the second wall 42. For instance, a user may desire to change the orientation of the second wall 42 when the spreader system 22 is in the storage position 12 to reduce the overall width of the spreading device 10 when being stored or transported.

While the figures depict a storage position 12 and a deployed position 14, it is contemplated that the aggregate spreading device 10 may be operated in any position between the storage position 12 and the deployed position 14, or even beyond the deployed position 14. That is, the deployed position 14 is depicted as having the first wall 40 oriented parallel with the conveyor system 20. However, it is also contemplated that the spreading device 10 may be operated with the spreader system 22 oriented so that the first wall 40 is less than parallel or past parallel with the conveyor system 20. In addition, the spreading device 10 may be stored or transported in any position between the storage position 12 and the deployed position 14 depicted in the figures.

Figure 7:
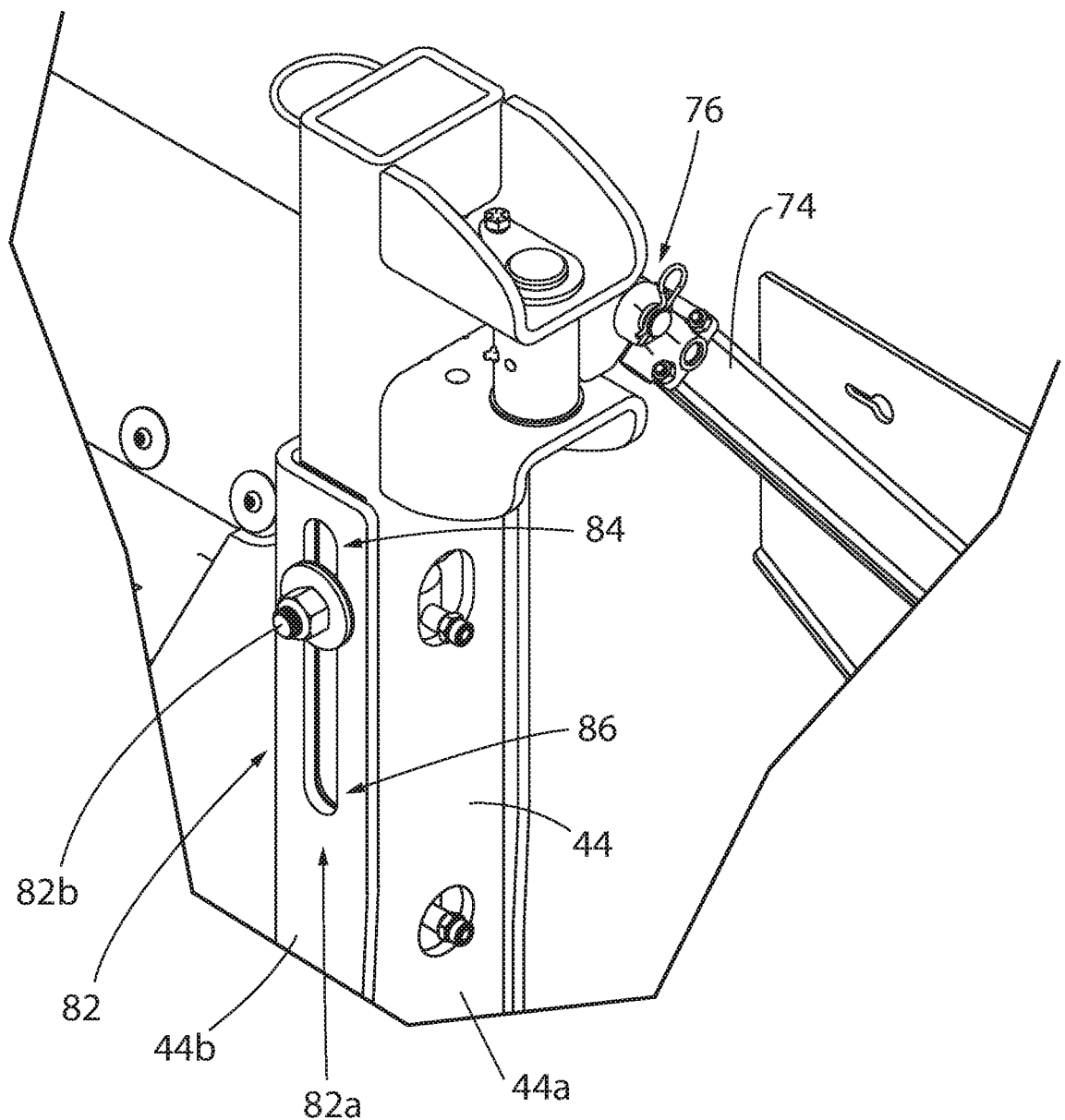
FIG. 7 is an enlarged view of a vertical support of the aggregate spreading device of FIG. 1.

The spreader system 22 further includes at least one vertical support 44 coupled to the support frame 16. Each vertical support 44 may be configured as a slide tower and include an inner portion 44a and an outer portion 44b. The inner portion 44a is configured to slidably transition within the outer portion 44b in order to adjust the overall height of the vertical portion 44. While FIG. 7 depicts the outer portion 44b partially surrounding the inner portion 44a, other embodiments of the invention may include the outer portion 44b completely surrounding the inner portion 44a. In yet other embodiments of the invention, the outer portion 44b may be disposed adjacent to the inner portion 44a and not surrounding the inner portion 44a at all. In other words, it is contemplated that the outer portion 44b may be slidably engaged with at least one side of the inner portion 44a of the vertical support 44. The benefits of this will be described below with respect to the actuator system 24. In the representative embodiment of the invention, the vertical supports 44 are coupled to the support frame 16 at locations 48, 50 disposed at distal ends 52, 54 of the hopper 18. In other embodiments of the invention, the vertical supports 44 may be disposed at any location on the support frame 16 including locations rearward and outside of the hopper 18. The first wall 40 is oriented perpendicular to the conveyor system 20 and extends outward from a first end 56 of the first wall 40, which is coupled to the vertical support 44, to a second end 58. In the representative embodiment of the invention, the first end 56 of the first wall 40 is attached to the inner portion 44a of the vertical support 44. The second wall 42 is coupled to the second end 58 of the first wall 40 and extends perpendicularly from the first wall 40. As will be further described in FIGS. 8-15, the spreader system 22 may be modular, and the first wall 40 may include one (1) or more sections.

The actuator system 24 includes a number of actuators, such as, but not limited to hydraulic actuators, pneumatic actuators, electrical actuators, etc. First, the actuator system 24 includes at least one position actuator 60 that transitions the spreader system 22 from the storage position 12 to the deployed position 14. The position actuator 60 has a first end 62 coupled to the support frame 16 and a second end 64 coupled to the first wall 40 of the spreader system 22. When the position actuator 60 is retracted, the spreader system 22 is in the storage position 12. When the position actuator 60 is extended, the spreader is in the deployed position 14.

Next, the actuator system 24 includes at least one lift actuator 66 to adjust the height of the vertical support 44 and the spreader system 22. The lift actuator 66 is able to move the spreader system 22 between an above-grade position (see first spreader system 22 in FIG. 5 above grade line 23), an at-grade position (see first spreader system 22 in FIG. 4 at grade line 23), and a below-grade position (see first spreader system 22 in FIG. 6 below grade line 23). The lift actuator 66 is disposed within the vertical support 44. As a result, when the lift actuator 66 expands, the inner portion 44a of the vertical support 44 is raised, and the spreader system 22, which is coupled to the inner portion 44a is raised in conjunction with the inner portion 44a. On the other hand, when the lift actuator 66 contracts, the inner portion 44a of the vertical support 44 is lowered, and the spreader system 22 is then lowered in conjunction with the inner portion 44a. In turn, the lift actuator 66 and vertical support 44 may be sized to allow the spreader system 22 to be located at any elevation above, at, or below grade. In one embodiment of the invention, the spreader system 22 may transition between 8 inches below grade to 2 inches above grade. However, as stated above, modifications to the size of the lift actuator 66 and the vertical support 44 can increase or decrease these distances.

As shown in FIG. 7, the vertical support 44 includes an alignment element 82 configured to guide the movement of the inner portion 44a within the outer portion 44b. In the representative embodiment of the invention, the alignment element 82 is in the form of a slot 82a formed in the outer portion 44b and an extension 82b extending outward from the inner portion 44a and into the slot 82a. As a result, when the inner portion 44a is raised and lowered within the outer portion 44b, the extension 82b moves up and down within the slot 82a. In addition, the slot 82a includes an upper end 84 and a lower end 86, which results in an upper limit and a lower limit, respectively, of motion for the inner portion 44a. That is, in addition, to modifications to the size of the lift actuator 66 and the vertical support 44, modifications to the size of the slot 82a can also increase or decrease the distance the spreader system 22 can transition above and below grade.

As a result, the spreader 10 is able to adjust to transition the spreader system 22 between locations below grade, at grade, and above grade without changing out or modifying the parts of the spreader 10. Therefore, the spreader 10 can be used to apply multiple layers of different aggregates without requiring a user to change out or modify parts of the spreader 10. For example, the spreader system 22 of the spreader 10 can be set at a first elevation, so that when the hopper 18 receives an aggregate such as dirt, the conveyor system 20 transitions the dirt to the spreader system 22, and the spreader system 22 distributes the dirt at the first elevation. Then, the spreader system 22 can be transitioned to a second elevation by way of the lift actuator 66, so that the hopper 18 can receive an aggregate such as gravel, the conveyor system 20 can transition the gravel to the spreader system 22, and the spreader system 22 can distribute the gravel at the second elevation. Additionally, the spreader system 22 can be transitioned to a third elevation by way of the lift actuator 66, so that the hopper 18 can receive an aggregate such as asphalt, the conveyor system 20 can transition the asphalt to the spreader system 22, and the spreader system 22 can distribute the asphalt at the third elevation. As such, the same machine can be used to distribute one or more aggregates at one or more levels.

Figure 16:
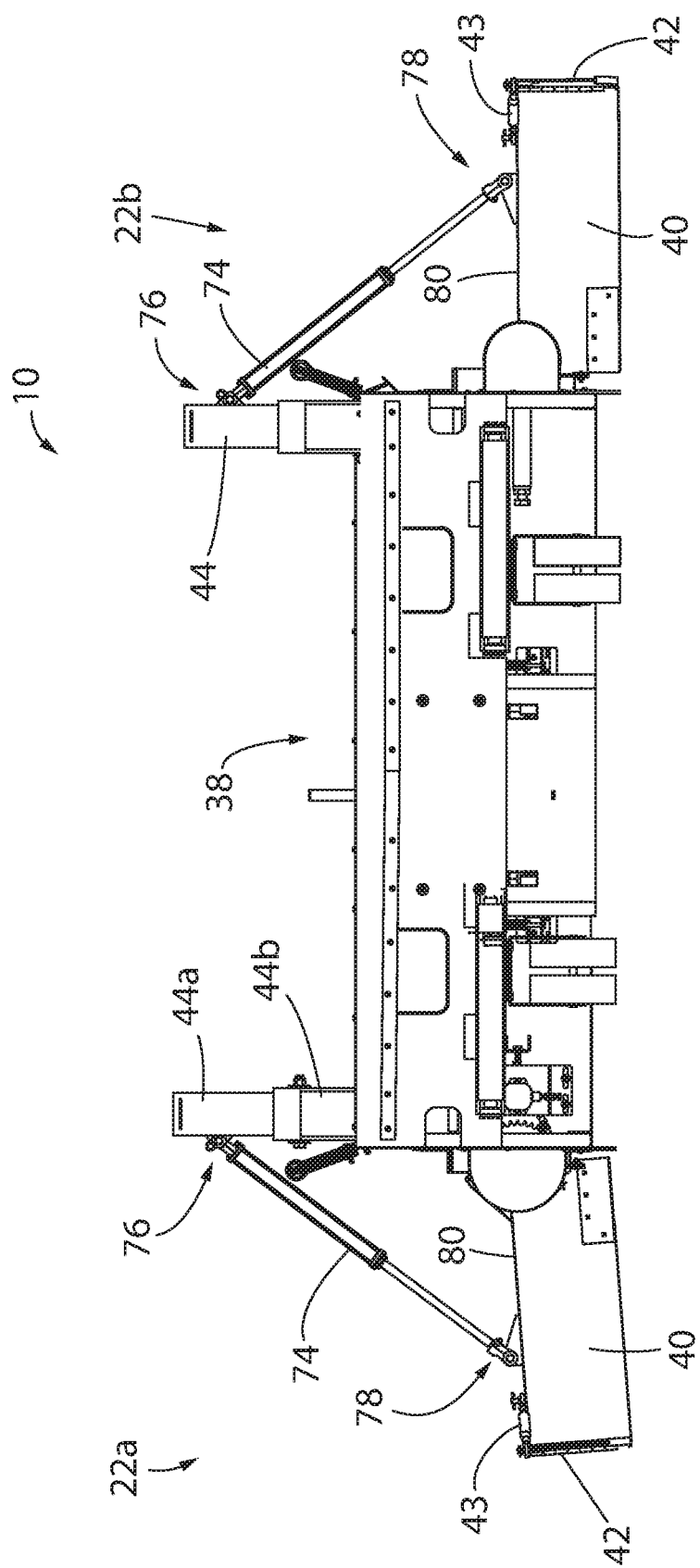
FIG. 16 is a front view of the aggregate spreading device of FIG. 1 with the left spreader system in the deployed position and oriented at an angle.

The actuator system 24 also includes a slope actuator 74 configured to adjust the slope of the first wall 40 of the spreader system 22 (see first spreader system 22 in FIG. 16). The slope actuator 74 has a first end 76 coupled to the vertical support 44 and a second end 78 coupled to an upper surface 80 of the first wall 40 of the spreader system 22. Alternatively, the first end 76 may be coupled to the support frame 16 or another location, while the second end 78 is coupled at any location along the spreader system 22. In turn, the slope actuator 74 is able to expand and retract to angle the spreader system 22 between a downslope and an upslope. The length of the slope actuator 74 may be adjusted to increase or decrease the upper and lower limits for angling the spreader system 22. It should also be noted that the slope of the spreader system 22 may also be influenced by the positions of any combination of the actuators 60, 66, 74 as they relate to each other. That is, the orientation of the actuators 60, 66, 74 may each alter the position of the spreader system 22, which results in the position of the spreader system 22 being affected by the combined orientation of the actuators 60, 66, 74.

In order to allow smooth transition of the spreader system 22 between the storage position 12 and the deployed position 14, the position actuator 60 and the slope actuator 74 may be pivotably coupled to the elements described above. Likewise, the position actuator 60 and the slope actuator 74 may be pivotably coupled to the elements described above to allow smooth transition of the spreader system 22 between above grade, at grade, below grade, and tilted positions.

Figure 8:
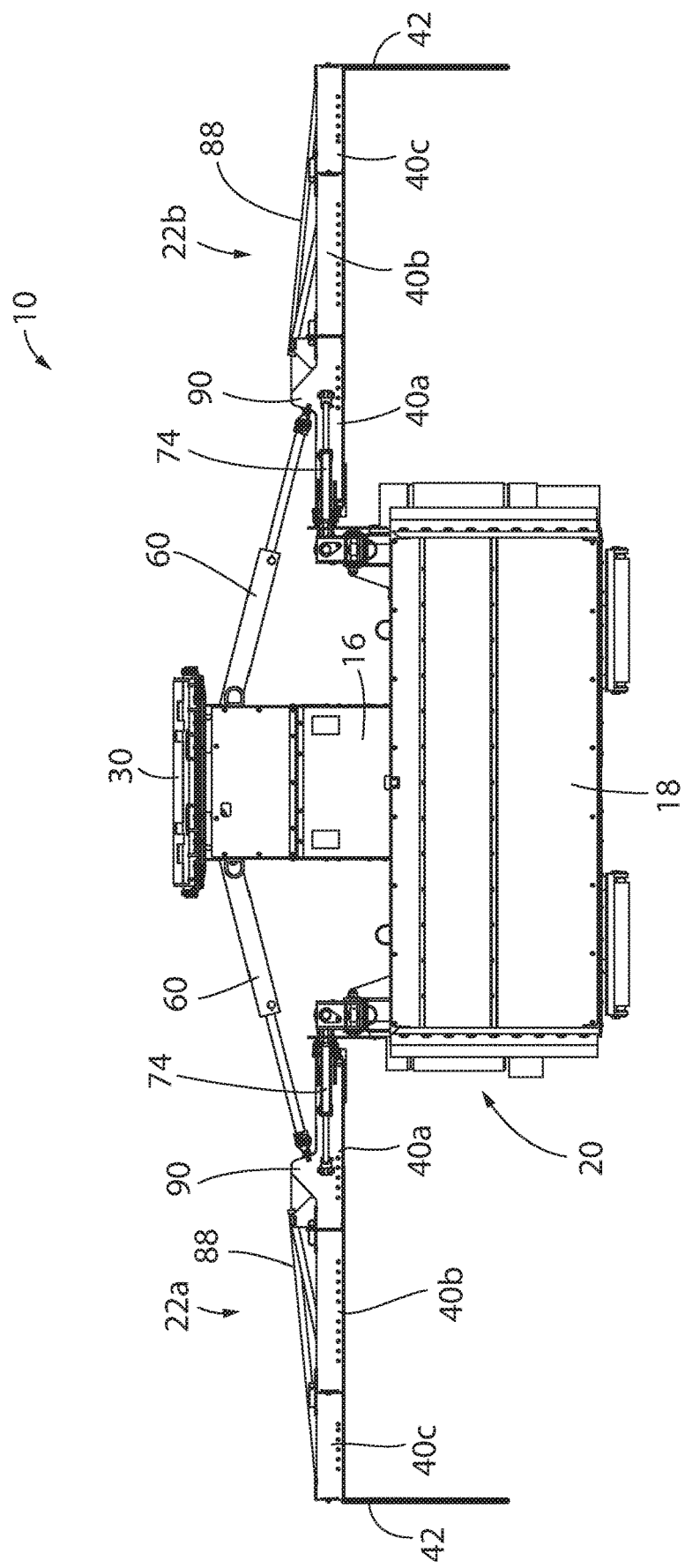
FIGS. 8-15 are top views of the aggregate spreading device of FIG. 1 with a variety of modular spreader system configurations.
Figure 9:
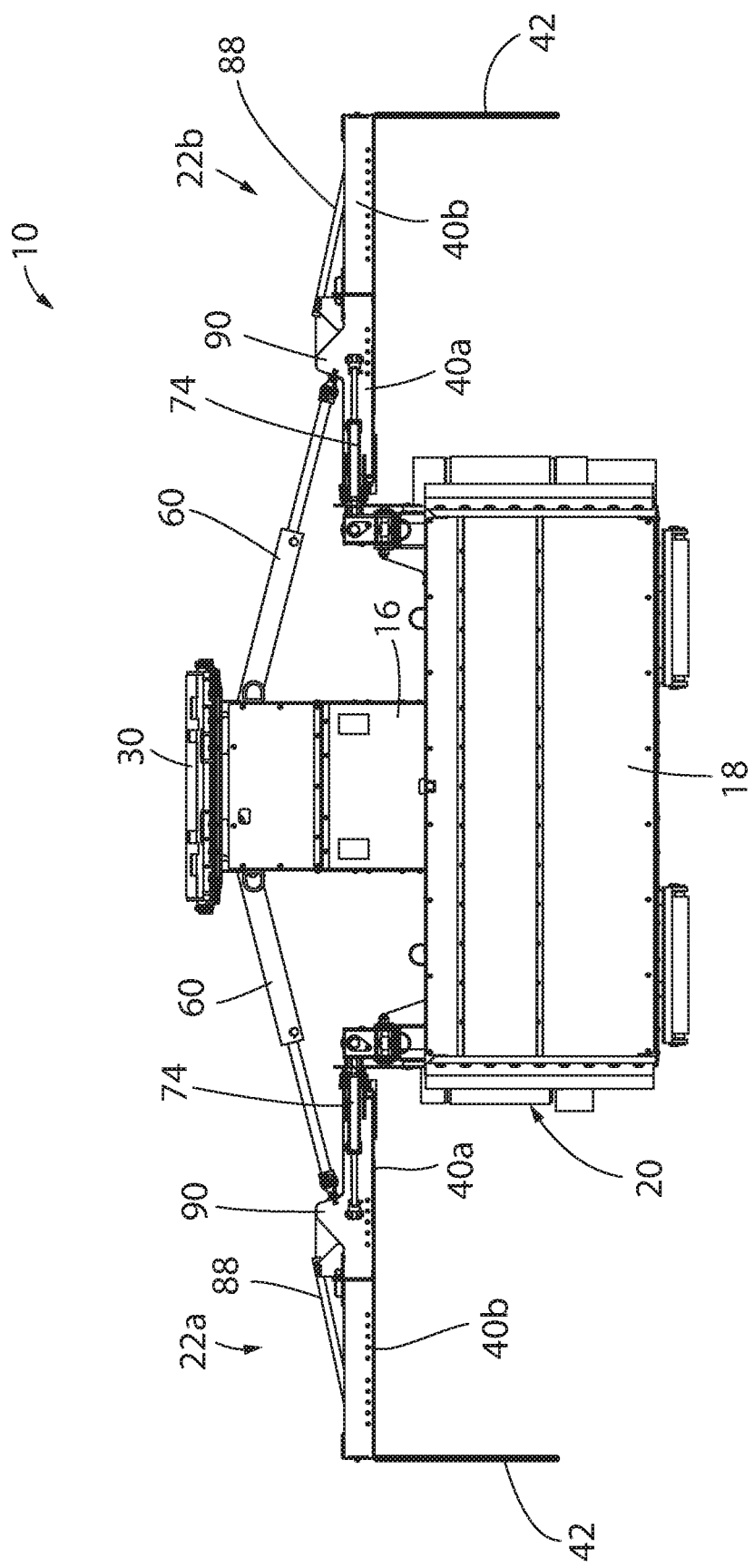

As shown in FIGS. 8-15, the first wall 40 of the spreader system 22 may be modular in design to be easily adjusted to a specific width of the spreader system 22. That is, the length of the first wall 40 is related to the width of the spreader system 22. The modular configuration may include a first segment 40a and any number of extension segments 40n, including no extension segments 40n. The first segment 40a that may be any length, for instance, 2 feet, 3 feet, etc. In one instance, multiple segments 40n may be used to extend the first wall 40 of the spreader system 22 up to 8 feet. However, in other embodiments of the invention, the first wall 40 may be extending any distance less than or greater than 8 feet. For instance, FIG. 8 depicts an aggregate spreading device 10 with a spreader system 22 on both the left and right sides of the device 10. Each spreader system 22 includes a first wall 40 having a first segment 40a, a first extension segment 40b, and a second extension segment 40c. As shown, each of the segments 40n may have the same or different lengths so that the first wall 40 may be set at any length required by the user. Alternatively, FIG. 9 depicts an aggregate spreading device with spreader systems 22 on the left and rights sides of the device and each having a first segment 40a and a first extensions segment 40b.

Figure 10:
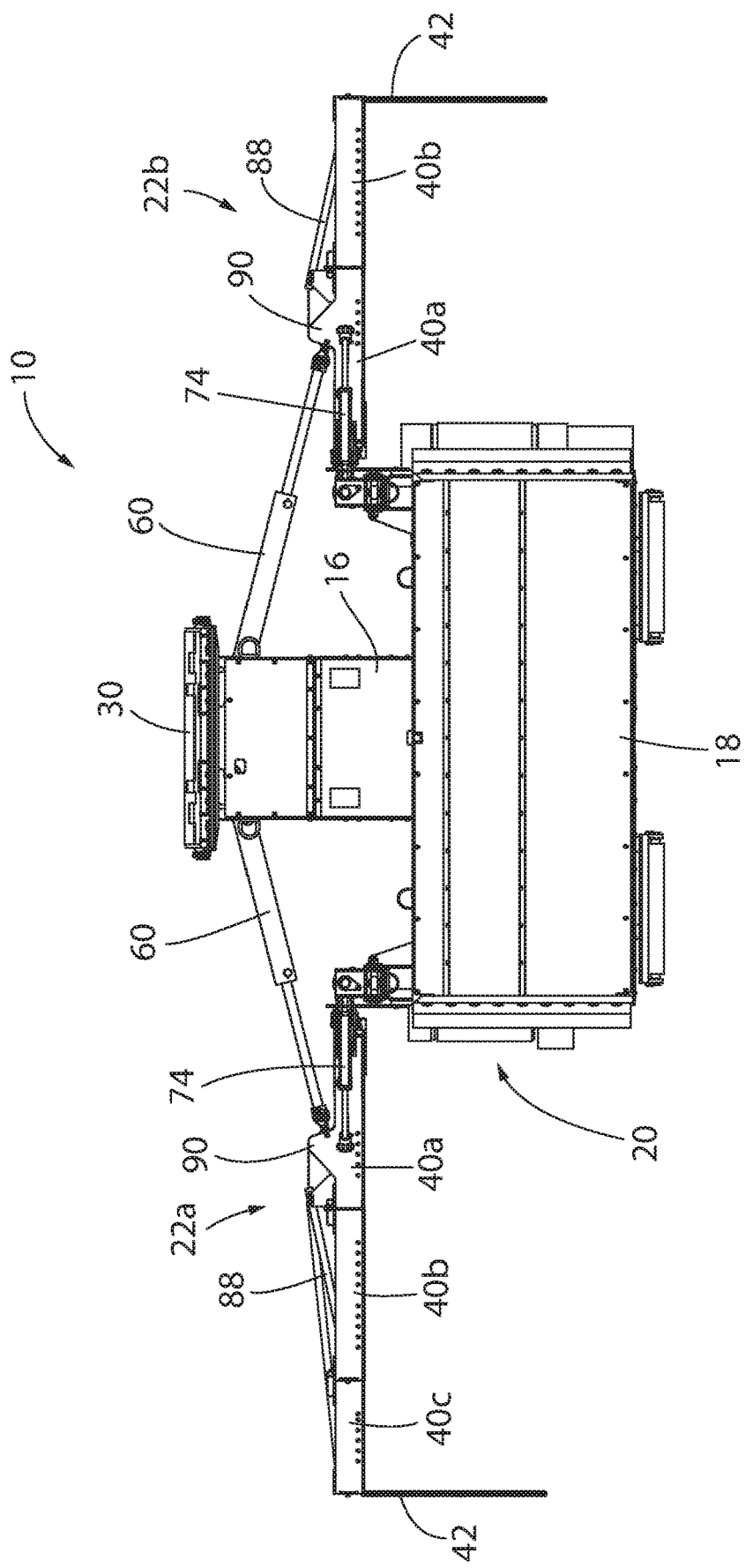
Figure 11:
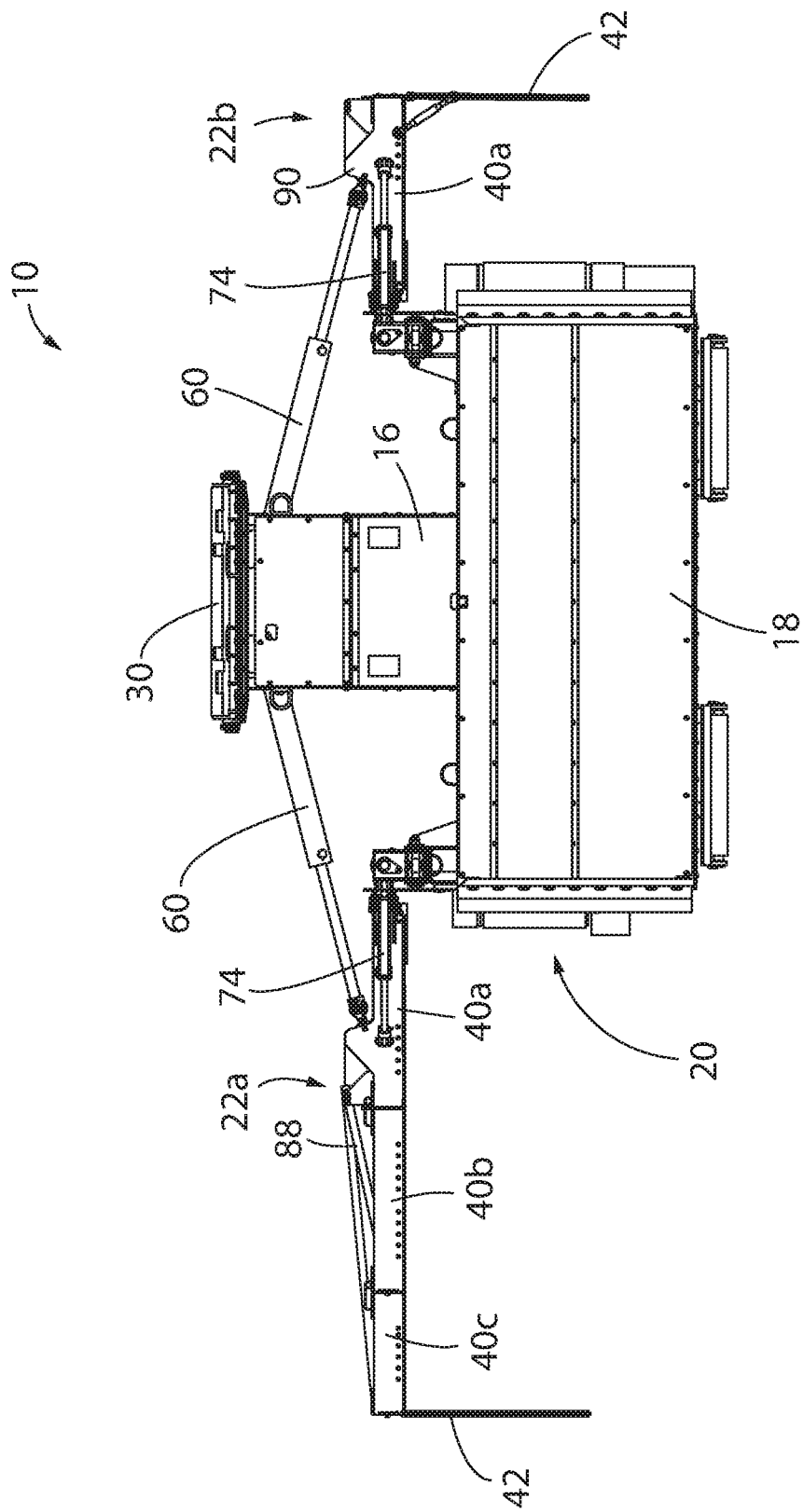
Figure 12:
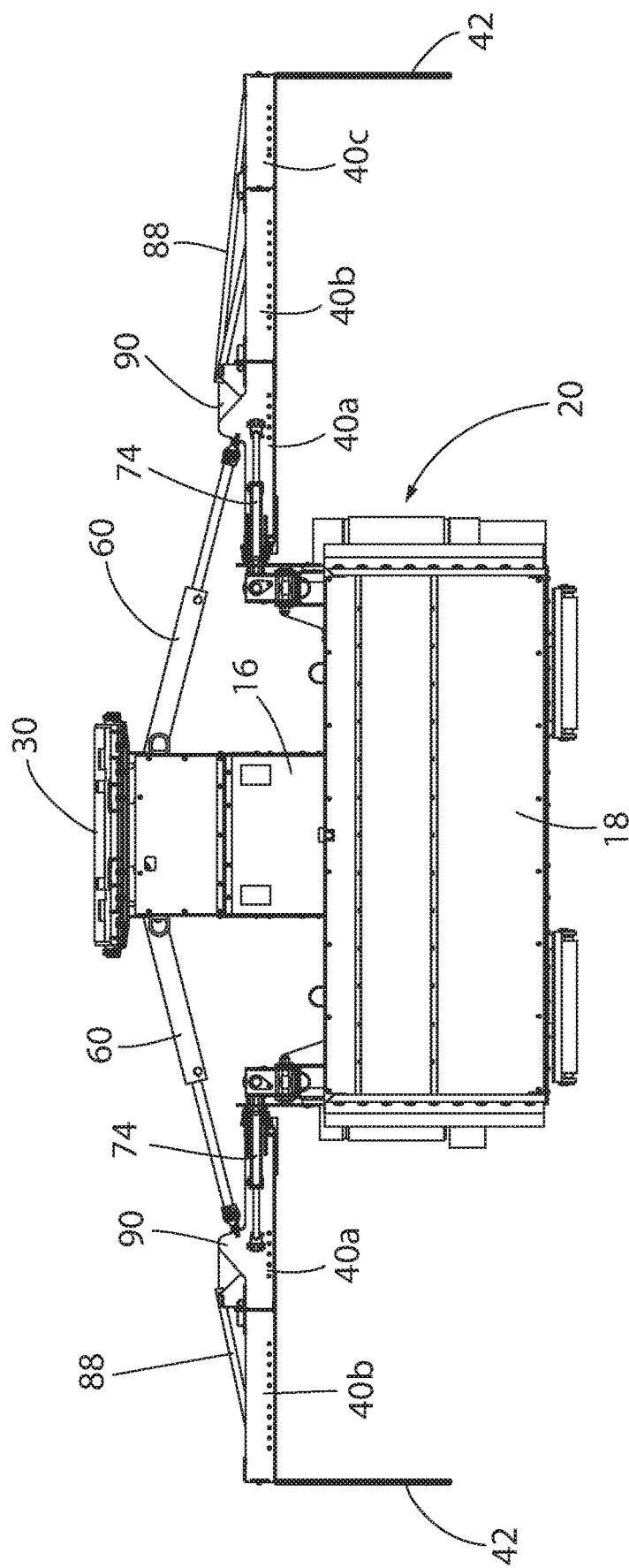
Figure 13:
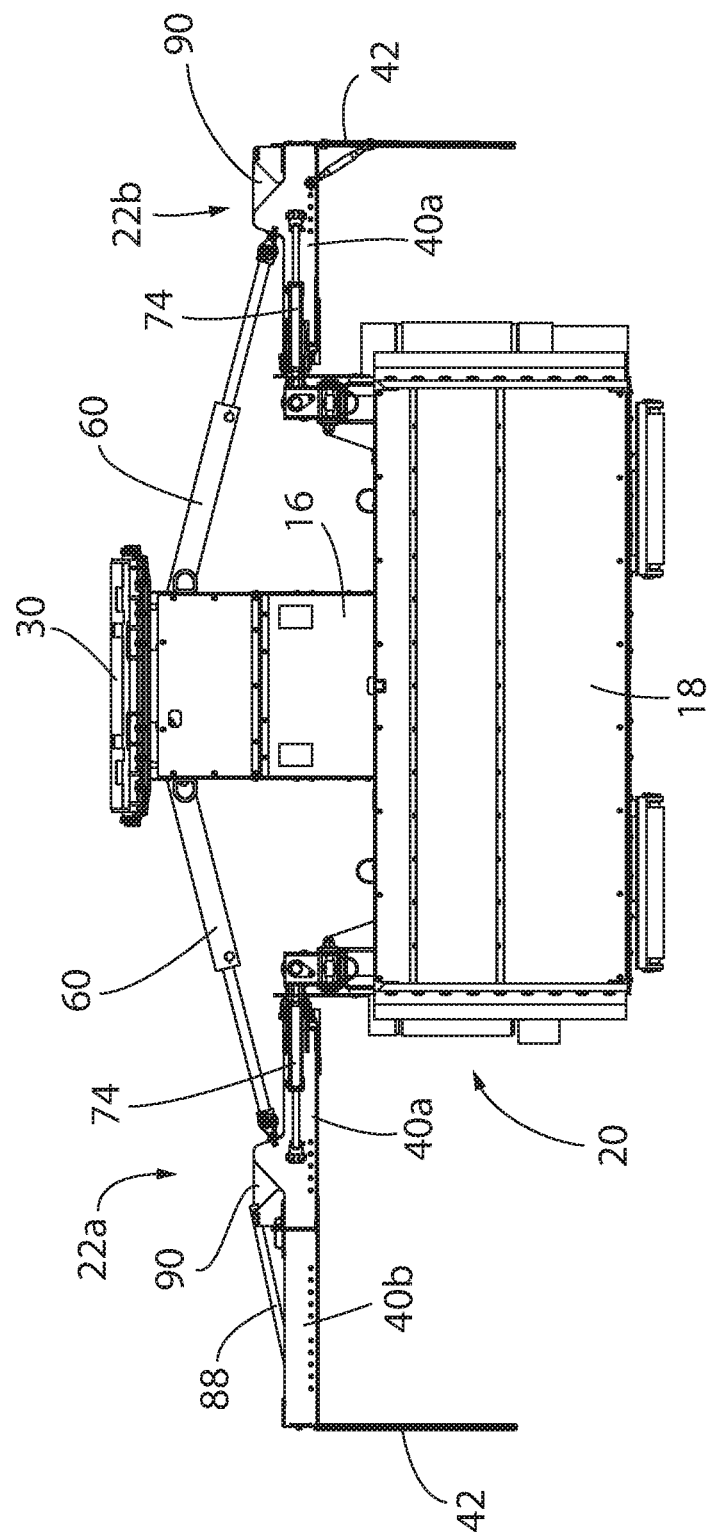
Figure 14:
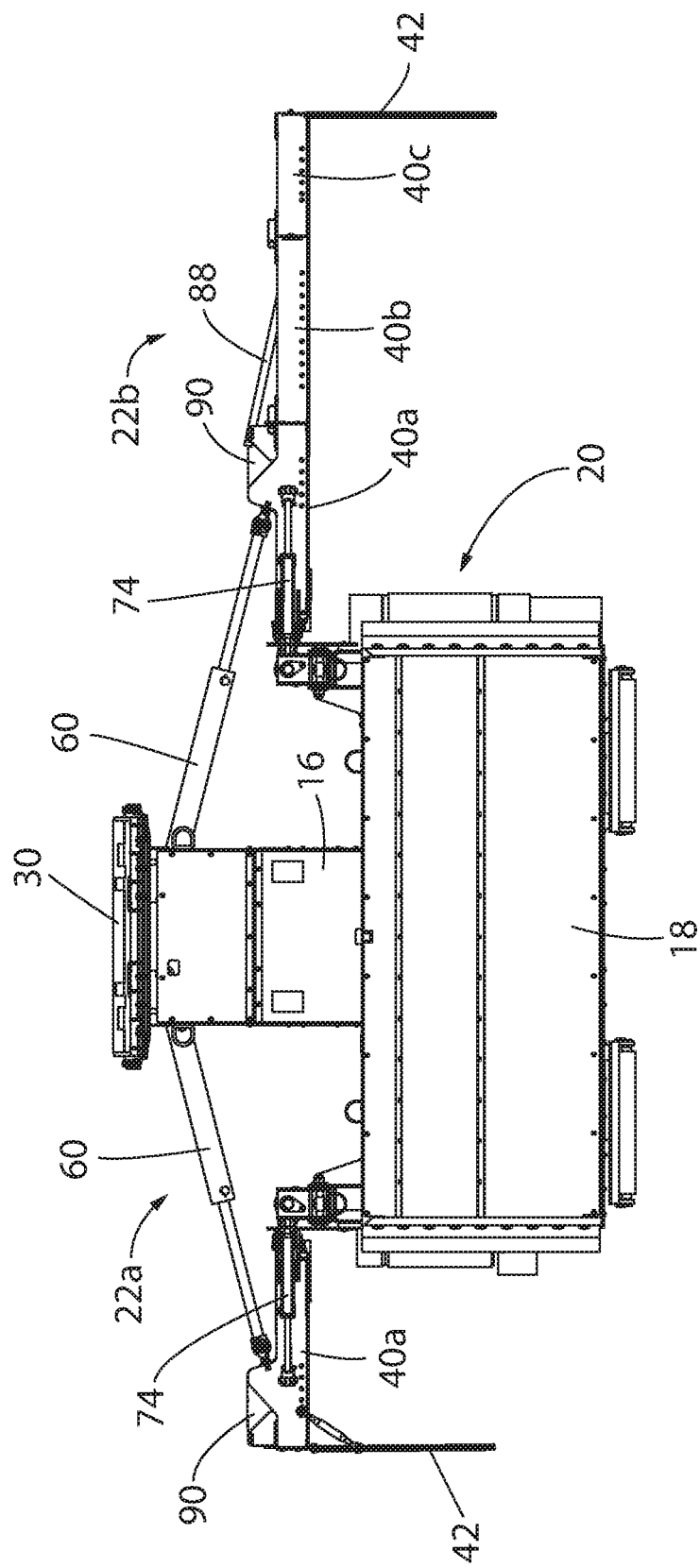
Figure 15:
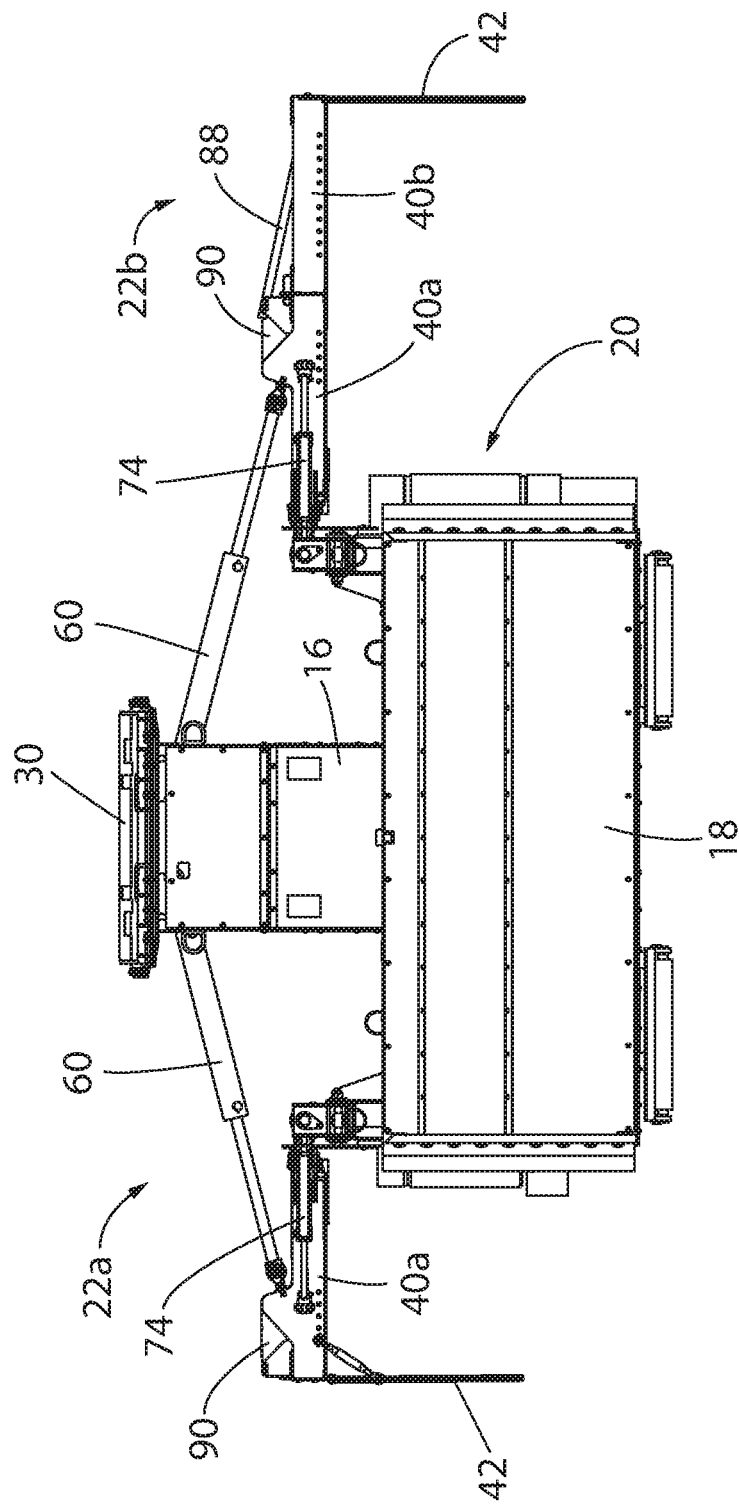

Additionally, FIGS. 10-15 illustrate further aggregate spreading devices 10 with varying spreader system 22 arrangements. As shown, the spreading device 10 on one side of the aggregate spreading device 10 may have a different arrangement than the spreading device 10 on the other side of the aggregate spreading device 10. For example, FIG. 10 depicts an aggregate spreading device 10 having the first spreader system 22a including a first segment 40a, a first extension segment 40b, and a second extension segment 40c, while the second spreader system 22b includes a first segment 40a and a first extensions segment 40b. Alternatively, the second spreader system 22b of FIG. 11 includes a first segment 40a. As shown in FIG. 12, the first spreader system 22a may include a first segment 40a and a first extension segment 40b, while the second spreader system 22b includes a first segment 40a, a first extension segment 40b, and a second extensions segment 40c. FIG. 13 depicts another embodiment wherein the first spreader system 22a includes a two segments 40a, 40b, while the second spreader system 22b includes a single segment 40a. Another embodiment is shown in FIG. 14 wherein the first spreader 22a includes one segment 40a, while the second spreader system 22b includes three segments 40a, 40b, 40c. FIG. 15 depicts another embodiment of the aggregate spreading device 10 with the first spreader 22a having one segment 40a and the second spreader 22b with two segments 40a, 40b.

It is contemplated that the aggregate spreading device 10 may include spreader systems 22 a first wall 40 having more combinations of extensions 40n than shown in FIGS. 10-15. Additionally, the first wall 40 of the spreader systems 22 may include any number of extensions 40n. As mentioned above, yet other embodiments of the invention may include a single spreading device 22 located on one side of the aggregate spreading device 10.

Additionally, FIGS. 10-15 depict the inclusion of a support rod 88, which assists in joining together the segments 40n and providing additional strength to a front wall 40 that includes multiple segments 40n. Each segment 40n may additionally be fastened to the adjacent segment 40n. As shown, an extension tab 90 extends from a rear surface 92 of the first segment 40a of the front wall 40. In turn, a support rod 88 may extend from the extension tab 90 of the first segment to a rear surface 94 of the furthest extension segment 40n. For example, in a first wall 40 having three segments 40a, 40b, 40c, the support rod 88 would extend from the extension tab 40a to the rear surface 94 of the second extension segment (third segment) 40c. In some embodiments of the invention, the rear surface 94 of the segments 40n may include a support rib 96 extending along the length of the segment 40n. In such embodiments of the invention, the support rod 88 may be attached to the support rib 96 of rear surface 94 of the segment 40n.

Figure 17:
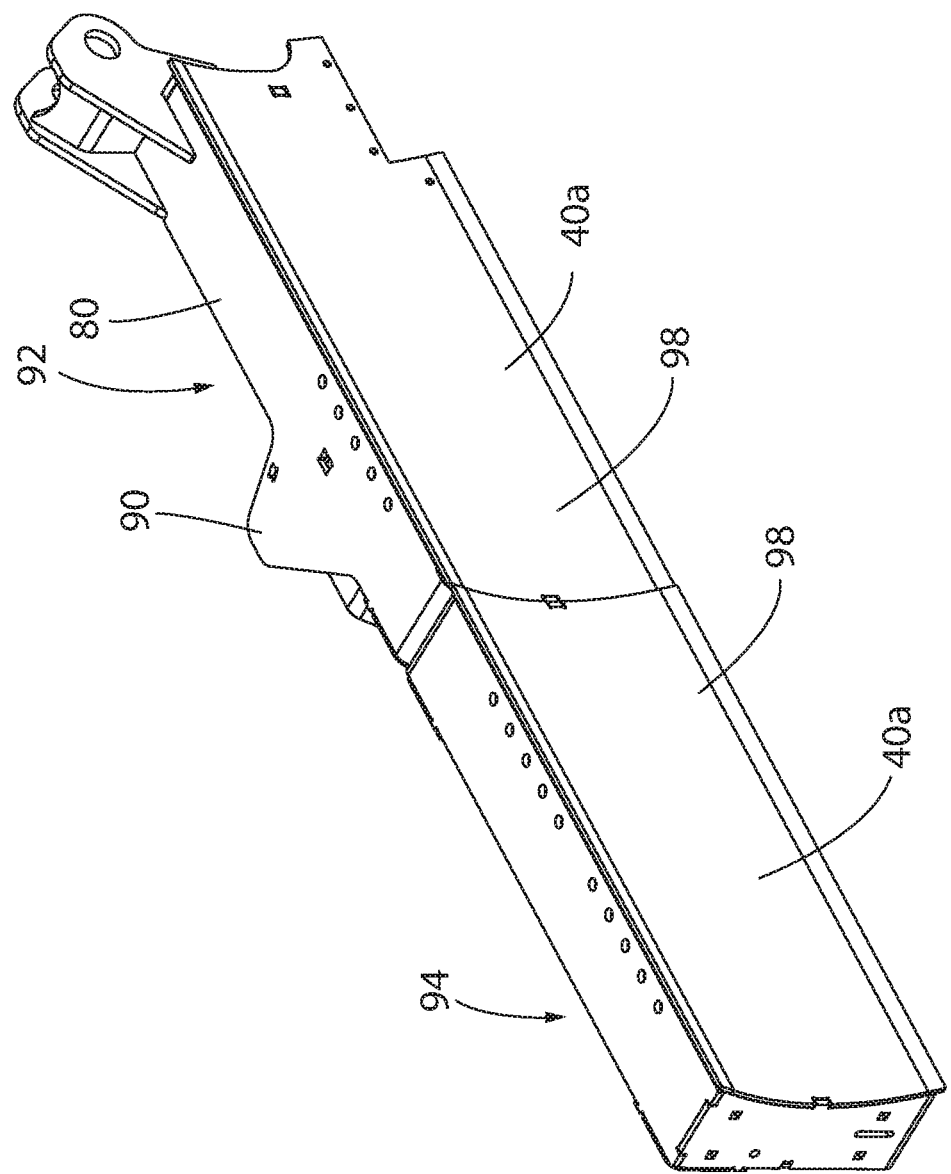
FIG. 17 depicts a perspective view of a first wall segment of the spreader system.
Figure 18:
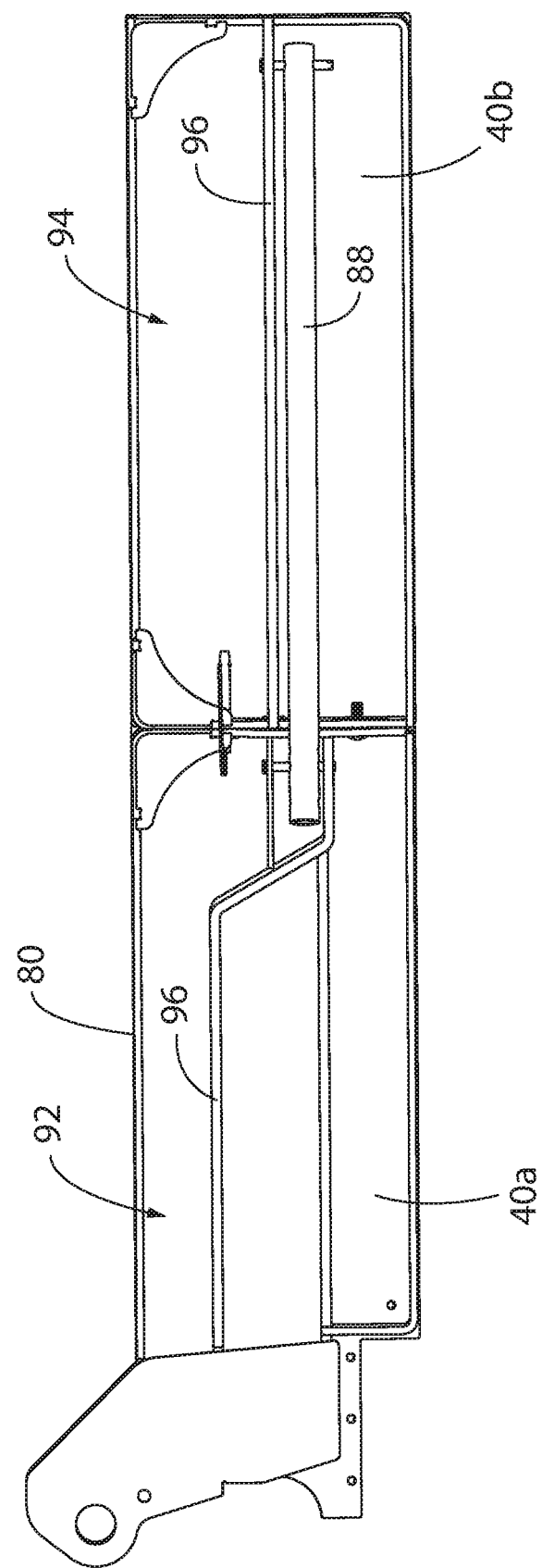
FIG. 18 depicts a rear view of a first wall segment of the spreader system.

Referring next to FIG. 17, a perspective view of the first wall 40 is shown. In the representative embodiment of the invention, a front surface 98 of the first wall 40 is concave in shape to increase the strength of the first wall 40 of the spreader system 22. In other embodiments of the invention, the front surface 98 may be vertical, angled, concave, convex, or any other shape.

It is also contemplated that controls for operating the aggregate spreading device 10 may be located onboard the aggregate spreading device 10, onboard the vehicle attached to the mounting plate 30, or on a remote-control device that may be handheld or mounted to a surface. By providing controls onboard the vehicle or on a remote-control device, an operator may control the aggregate spreading device 10 while being in a safer location away from the aggregate spreading device 10. The controls may include operation of the conveyor system 20 and the actuator system 24, which orients the spreader system 22.

Although the best mode contemplated by the inventor of carrying out the present invention is disclosed above, practice of the present invention is not limited thereto. It will be manifest that various additions, modifications, and rearrangements of the features of the present invention may be made without deviating from the spirit and scope of the underlying inventive concept. Moreover, the individual components need not be formed in the disclosed shapes, or assembled in the disclosed configuration, but could be provided in virtually any shape and assembled in virtually any configuration. Furthermore, all the disclosed features of each disclosed embodiment can be combined with, or substituted for, the disclosed features of every other disclosed embodiment except where such features are mutually exclusive.

It is intended that the appended claims cover all such additions, modifications, and rearrangements. Expedient embodiments of the present invention are differentiated by the appended claims.

What is claimed is:

1. An aggregate spreading device comprising:
   a hopper;
   a conveyor system disposed below the hopper;
   a spreader system pivotably connected to at least one side of the aggregate spreading device and configured to receive aggregate from the conveyor system;
   a lift actuator configured to adjust a vertical placement of the spreader system;
   a position actuator for pivoting the spreader system between a storage position and a deployed position; and
   a slope actuator configured to adjust a slope angle of the spreader system;
   wherein one or more of the lift actuator, the slope actuator, and the position actuator are configured to transition the spreader system between positions above a grade line, at the grade line, below the grade line, and tilted across the grade line.

2. The aggregate spreading device of claim 1 wherein spreader system includes:
   a vertical support coupled to a frame of the aggregate spreading device;
   a first wall extending from the vertical support; and
   a second wall extending perpendicularly from the first wall;
   wherein the lift actuator adjusting the vertical placement of the spreader system causes the first and second walls to move vertically.

3. The aggregate spreading device of claim 2 wherein the vertical support includes an inner portion configured to slidably transition within an outer portion as the lift actuator adjusts the vertical placement of the spreader system.

4. The aggregate spreading device of claim 2 wherein the first wall includes one or more segments coupled together.

5. The aggregate spreading device of claim 2 wherein the first wall has a concave surface.

6. An aggregate spreading device comprising:
   a hopper supported by a support frame;
   a conveyor system disposed below an exit opening of the hopper;
   a first spreader system pivotably connected to a first end of the support frame;
   a second spreader system pivotably connected to a second end of the support frame;
   at least one lift actuator configured to independently adjust the vertical placement of each spreader system;
   at least one position actuator configured to pivot each spreader system between a storage position and a deployed position; and
   at least one slope actuator configured to independently adjust the slope angle of each spreader system;
   wherein one or more of the at least one lift actuator, the at least one slope actuator, and the at least one position actuator are configured to transition each spreader system between positions above a grade line, at the grade line, below the grade line, and tilted across the grade line.

7. The aggregate spreading device of claim 6 wherein each spreader system includes:
   a vertical support including a first portion slidably engaged with a second portion;
   a first wall having a first end attached to the vertical support;
   a second wall extending from a second end of the first wall.

8. The aggregate spreading device of claim 7 wherein actuation of the lift actuator causes the first portion of the vertical support to move with respect to the second portion of the vertical support.

9. The aggregate spreading device of claim 8 wherein the vertical support includes an alignment element to guide movement of the first portion of the vertical support.

10. The aggregate spreading device of claim 9 wherein the alignment element includes a slot formed in the second portion of the vertical support and an extension extending outward from the first portion of the vertical support;
    wherein the extension extends through the slot.

11. The aggregate spreading device of claim 7 wherein the first portion of the vertical support is partially surrounded by the second portion of the vertical support.

12. The aggregate spreading device of claim 7 wherein the first wall comprises one or more segments coupled together.

13. A spreader system for an aggregate spreading device, the spreader system comprising:
    a vertical support coupled to the aggregate spreading device, the vertical support having a first portion slidably engaged with a second portion;
    a first wall extending from a first end to a second end, the first end being pivotably coupled to the vertical support;
    a second wall extending from the second end of the first wall;
    a lift actuator configured to cause the first portion of the vertical support to move with the respect to the second portion of the vertical support to adjust the vertical position of the first and second walls;

a position actuator configured to pivot the first wall between a deployed position and a storage position; and a slope actuator configured to adjust the slope angle of the first wall;

wherein one or more of the lift actuator, the slope actuator, and the position actuator are configured to transition the first wall between positions above a grade line, at the grade line, below the grade line, and tilted across the grade line.

14. The aggregate spreader system of claim 13 wherein the vertical support includes an alignment element to guide movement of the first portion of the vertical support.

15. The aggregate spreader system of claim 13 wherein the alignment element includes:

a slot formed in the second portion of the vertical support; and an extension extending outward from the first portion and into the slot.

16. The aggregate spreader system of claim 13 wherein the first wall comprises a first segment and one or more removable extension segments.

\* \* \* \* \*